(12) United States Patent
Lee et al.

(10) Patent No.: US 6,288,710 B1
(45) Date of Patent: Sep. 11, 2001

(54) METHOD AND APPARATUS FOR DETECTING THE POSITION OF A COORDINATE PROBE RELATIVE TO A DIGITIZING TABLET

(75) Inventors: Wen-Chin Lee, Taipei; Shun-Pin Lin, Chunghwa Hsien, both of (TW)

(73) Assignee: UC-Logic Technology Corp., Taipei Hsien (TW)

( * ) Notice: Subject to any disclaimer, the term of this patent is extended or adjusted under 35 U.S.C. 154(b) by 0 days.

(21) Appl. No.: 09/372,937

(22) Filed: Aug. 12, 1999

(30) Foreign Application Priority Data

Mar. 12, 1999 (TW) ................................................ 88103832

(51) Int. Cl.$^7$ ..................................................... G09G 5/00
(52) U.S. Cl. .......................... 345/173; 345/174; 345/177; 345/179; 178/18.01; 178/18.03; 178/18.07
(58) Field of Search .................................... 345/173, 174, 345/177, 179; 178/18.01, 18.03, 18.04, 18.05, 18.06, 18.07, 19.01–19.05, 20.01–20.04

(56) References Cited

U.S. PATENT DOCUMENTS

| 4,210,775 | * | 7/1980 | Rodgers et al. ................. 178/20.02 |
| 4,368,351 | * | 1/1983 | Zimmer ............................. 178/18.07 |
| 4,661,656 | * | 4/1987 | Rodgers et al. ................. 178/20.01 |
| 4,890,096 | | 12/1989 | Taguchi et al. . |
| 5,028,745 | | 7/1991 | Yamanami et al. . |
| 5,070,217 | | 12/1991 | Kobayashi et al. . |
| 5,122,623 | * | 6/1992 | Zank et al. ........................ 178/19.04 |
| 5,194,699 | * | 3/1993 | Zalenski ............................ 178/18.07 |
| 5,220,324 | | 6/1993 | Morita . |

* cited by examiner

Primary Examiner—Almis R. Jankus
Assistant Examiner—Amr Awad
(74) Attorney, Agent, or Firm—Christensen O'Connor Johnson Kindness PLLC

(57) ABSTRACT

In a method and apparatus for detecting the position of a coordinate probe relative to a digitizing tablet, a sensing coil grid provided on a working region of the tablet includes a plurality of sensing coils, each of which is U-shaped and has a front section and a grounded rear section. The coils are arranged in parallel along an axis of the working region in an overlapping manner with the front sections of consecutive ones of the coils being arranged in succession, and with the rear sections of the coils also being arranged in succession. During the sequential scanning of the coils in order to detect the electric currents induced therein and to generate a grid signal when the coordinate probe is disposed on the working region, a phase selection circuit inverts one of front and rear half-cycles of the grid signal, depending on whether a front scanning or rear scanning operation is being performed, and a signal processing circuit detects the presence of a predetermined transition of the inverted signal from the phase selection circuit. The signal processing circuit generates a count output corresponding to time elapsed before the predetermined transition is detected, and the count output is converted by a processor into a coordinate of the coordinate probe along the axis of the working region of the tablet.

42 Claims, 9 Drawing Sheets

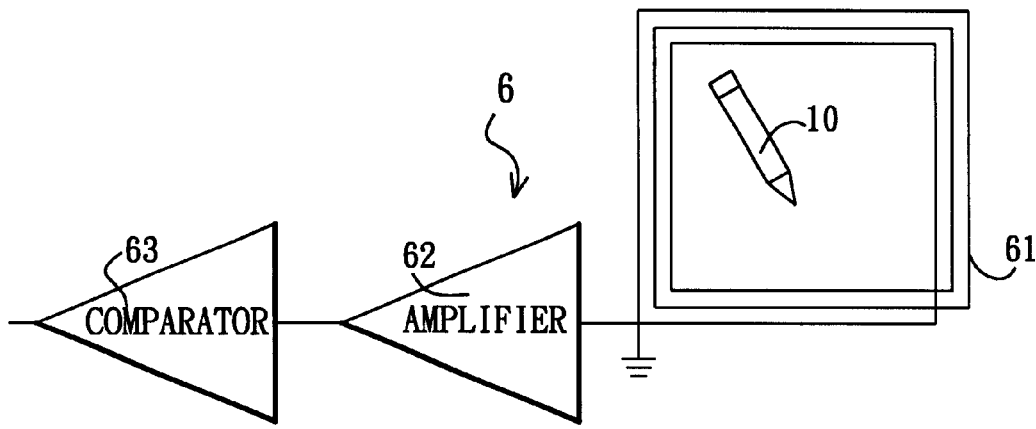
F I G. 5
| INVERTING SIGNAL | SYNCHRONIZING SIGNAL | CLOSING SWITCH S1–S4 | FUNCTION |
|---|---|---|---|
| 0 | 0 | S1 | NON-INVERT |
| 0 | 1 | S2 | INVERT |
| 1 | 0 | S3 | INVERT |
| 1 | 1 | S4 | NON-INVERT |
F I G. 6

F I G. 8
F I G. 9
F I G. 10
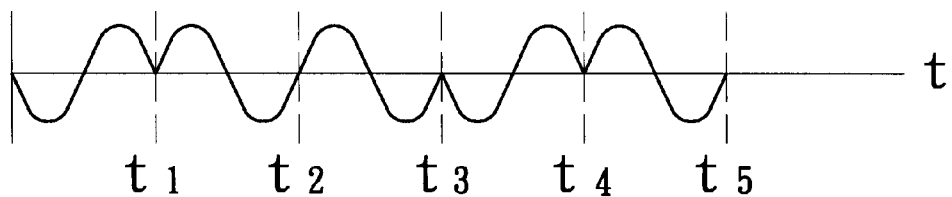
F I G. 11

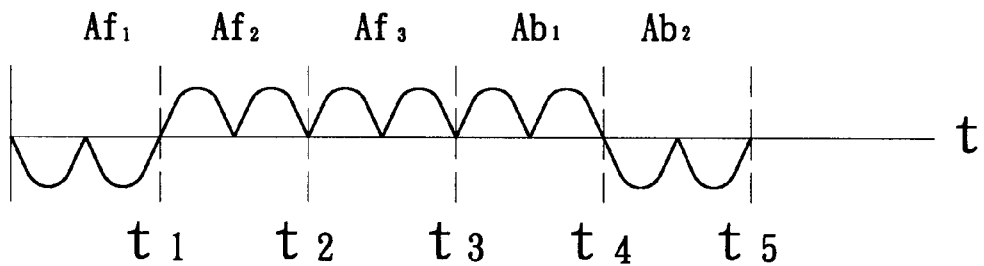
F I G. 12
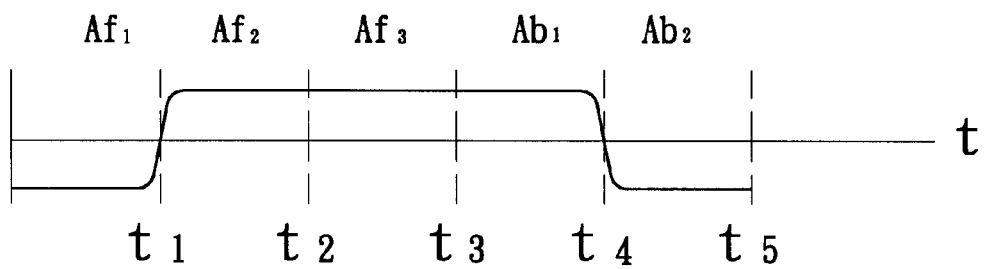
F I G. 13
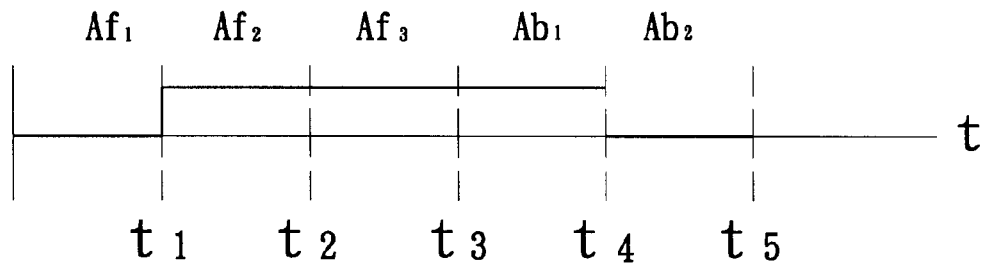
F I G. 14

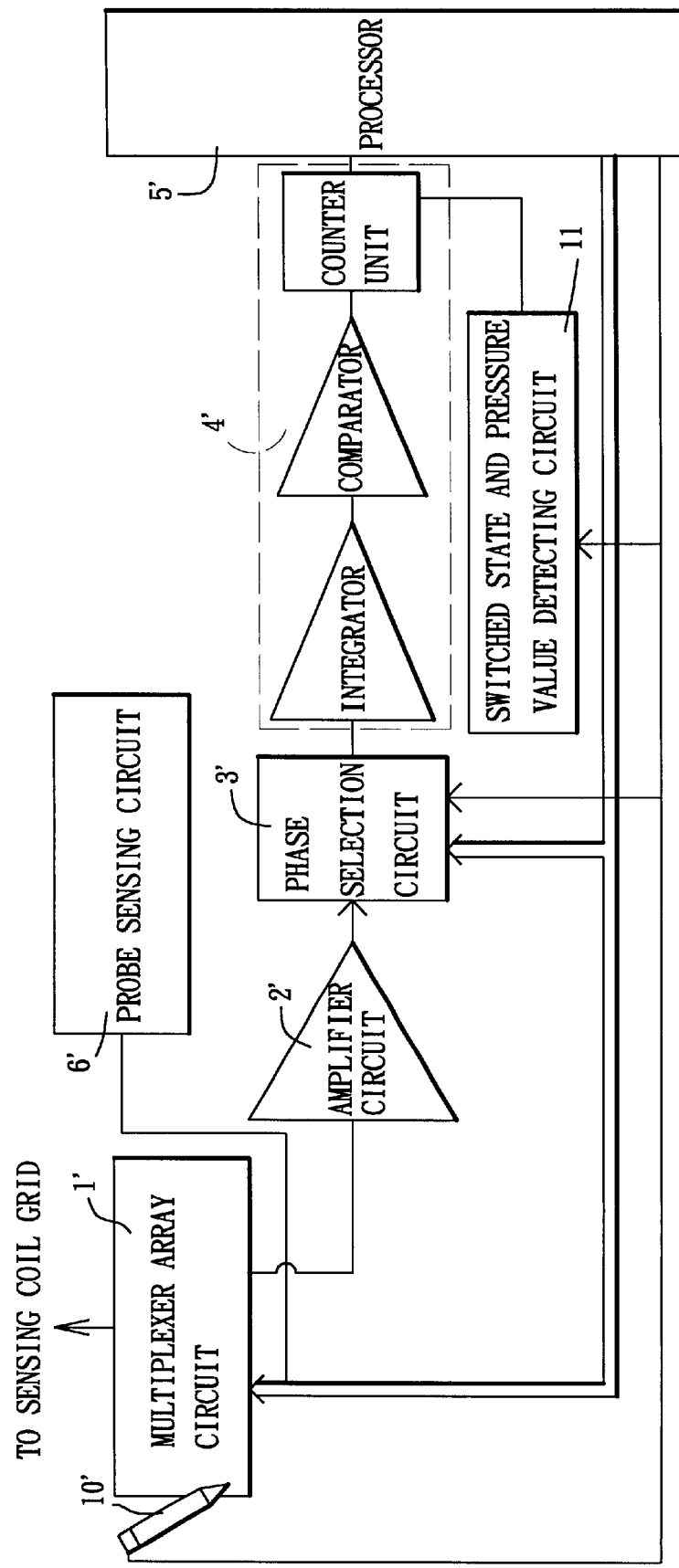
F I G. 16

METHOD AND APPARATUS FOR DETECTING THE POSITION OF A COORDINATE PROBE RELATIVE TO A DIGITIZING TABLET

BACKGROUND OF THE INVENTION

1. Field of the Invention

The invention relates to a digitizing tablet, more particularly to a method and apparatus for detecting the position of a coordinate probe relative to a digitizing tablet.

2. Description of the Related Art

Generally, a digitizing tablet is used with a coordinate probe that radiates an electromagnetic coordinate signal. The coordinate signal is received by a sensing coil grid that is provided on a working region of the digitizing tablet. When the coordinate probe is located between two sensing coils of the grid, the electric currents induced in these sensing coils have a 180° phase difference therebetween, as shown in FIG. 1. A series of processing circuits, such as signal amplifiers, filters, signal conditioners, counters and processors, are employed to process the electric currents induced in the sensing coils of the grid so as to generate a corresponding coordinate data output.

It is noted that the circuitry needed to process the current signals captured in the conventional digitizing tablet is relatively complicated, thereby resulting in relatively high operating power consumption and relatively high manufacturing costs. Particularly, the conventional digitizing tablet incorporates a multiplexer array associated with the sensing coil grid for connecting the latter to the processing circuitry. The multiplexer array includes a plurality of switches, and each switch is connected to one of the sensing coils. Since the number of switches is equal to the number of sensing coils in the grid, the conventional digitizing tablet is relatively costly to implement.

Further, there are two types of coordinate probes, wired and wireless, available for use with a digitizing tablet. Wired coordinate probes require a cable connection with the digitizing tablet for receiving an excitation signal therefrom. Once excited, the wired coordinate probes radiate the coordinate signal that is received by the sensing coil grid on the working region of the digitizing tablet. On the other hand, wireless coordinate probes do not require a cable connection with the digitizing tablet, and are capable of being activated to radiate the coordinate signal that is received by the sensing coil grid on the working region of the digitizing tablet. The sensing coils of the grid are scanned sequentially with the use of the multiplexer array to determine the position of the coordinate probe relative to the digitizing tablet.

However, regardless of the type of coordinate probe that is in use, erroneous operation of the digitizing tablet, which can inconvenience the user, easily occurs due to phantom images arising from noise or detection of electric current induced in the sensing coils albeit the coordinate probe is not disposed on the working region of the digitizing tablet.

SUMMARY OF THE INVENTION

Therefore, the main object of the present invention is to provide a method and apparatus for detecting the position of a coordinate probe relative to a digitizing tablet, where a phase selection circuit is employed to permit a reduction in the number of the sensing coils, as well as the switches of the multiplexer array, in order to simplify the circuitry of the digitizing tablet and reduce the manufacturing costs.

Another object of the present invention is to provide a method and apparatus for detecting the position of a coordinate probe relative to a digitizing tablet, where electric current induced in the sensing coils are verified to minimize erroneous operation of the digitizing tablet.

According to one aspect of the invention, there is provided a method for detecting the position of a coordinate probe, which radiates an electromagnetic coordinate signal, relative to a digitizing tablet. The method comprises:

(a) providing a sensing coil grid on a working region of the digitizing tablet, the sensing coil grid including a plurality of sensing coils, each of which is U-shaped and has a front section and a grounded rear section, the sensing coils being arranged in parallel along an axis of the working region in an overlapping manner with the front sections of consecutive ones of the sensing coils being arranged in succession, and with the ear sections of the consecutive ones of the sensing coils also being arranged in succession, wherein electric currents are induced in the sensing coils by virtue of the coordinate signal when the coordinate probe is disposed on the working region;

(b) performing a front scanning operation, including
scanning in sequence the sensing coils in order to detect the electric currents induced therein and to generate a grid signal,
generating an inverted signal by inverting a predetermined one of front and rear half-cycles of the grid signal, and
detecting a predetermined transition of the inverted signal from a first logic state to a second logic state;

(c) performing a rear scanning operation when the predetermined transition of the inverted signal is not detected after the front scanning operation has been completed, including
repeating sequential scanning of the sensing coils in order to continue generation of the grid signal,
generating the inverted signal by inverting the other one of the front and rear half-cycles of the grid signal, and
detecting the predetermined transition of the inverted signal from the first logic state to the second logic state;

(d) generating a count output corresponding to time elapsed before the predetermined transition of the inverted signal is detected; and (e) converting the count output into a coordinate of the coordinate probe along the axis of the working region of the digitizing tablet.

According to another aspect of the invention, there is provided an apparatus for detecting the position of a coordinate probe, which radiates an electromagnetic coordinate signal, relative to a digitizing tablet. The apparatus comprises:

a sensing coil grid adapted to be provided on a working region of the digitizing tablet, the sensing coil grid including a plurality of sensing coils, each of which is U-shaped and has a front section and a grounded rear section, the sensing coils being arranged in parallel along an axis of the working region in an overlapping manner with the front sections of consecutive ones of the sensing coils being arranged in succession, and with the rear sections of the consecutive ones of the sensing coils also being arranged in succession, wherein electric currents are induced in the sensing coils by virtue of the coordinate signal when the coordinate probe is disposed on the working region;

a multiplexer array circuit connected to the front sections of the sensing coils;

a phase selection circuit connected to the multiplexer array circuit;

a signal processing circuit connected to the phase selection circuit; and processor means connected to the multiplexer array circuit, the phase selection circuit and the signal processing circuit.

The processor means is operable to perform a front scanning operation, where the processor means controls the multiplexer array circuit to connect the sensing coils in sequence to the phase selection circuit such that the sensing coils are scanned sequentially in order to detect the electric currents induced therein and in order to generate a grid signal that is received by the phase selection circuit, where the processor means controls the phase selection circuit to generate an inverted signal by inverting a predetermined one of front and rear half-cycles of the grid signal, and where the signal processing circuit detects a predetermined transition of the inverted signal from a first logic state to a second logic state.

The processor means is further operable so as to perform a rear scanning operation when the predetermined transition of the inverted signal is not detected by the signal processing circuit after the front scanning operation has been completed, where the processor means controls the multiplexer array circuit to repeat sequential scanning of the sensing coils in order to continue generation of the grid signal, where the processor means controls the phase selection circuit so as to generate the inverted signal by inverting the other one of the front and rear half-cycles of the grid signal, and where the signal processing circuit detects the predetermined transition of the inverted signal from the first logic state to the second logic state.

The signal processing circuit generates a count output corresponding to time elapsed before the predetermined transition of the inverted signal is detected.

The processor means receives the count output from the signal processing circuit, and converts the count output into a coordinate of the coordinate probe along the axis of the working region of the digitizing tablet.

In the preferred embodiments, various means are employed to inhibit conversion of the count output into the coordinate of the coordinate probe when the coordinate probe is not disposed on the working region of the digitizing tablet.

BRIEF DESCRIPTION OF THE DRAWINGS

Other features and advantages of the present invention will become apparent in the following detailed description of the preferred embodiments with reference to the accompanying drawings, of which:

FIG. 5 is a schematic diagram illustrating a synchronizing signal circuit of the first preferred embodiment;

FIG. 6 is a truth table of the phase selection circuit shown in FIG. 4;

FIG. 8 illustrates an inverted signal generated by the phase selection circuit and corresponding to the coordinate signal of FIG. 7A;

FIG. 9 illustrates a filtered output of an integrator of a signal processing circuit corresponding to the inverted signal of FIG. 8;

FIG. 10 illustrates a pulse output of a comparator of the signal processing circuit corresponding to the filtered output of FIG. 9;

FIG. 11 illustrates a grid signal provided to the phase selection circuit when the coordinate probe is located between rear sections $A_{b1}$ and $A_{b2}$ of the sensing coils of the sensing coil grid of FIG. 3;

FIG. 12 illustrates an inverted signal generated by the phase selection circuit corresponding to the grid signal of FIG. 11;

FIG. 13 illustrates a filtered output of the integrator of the signal processing circuit corresponding to the inverted signal of FIG. 12;

FIG. 14 illustrates a pulse output of the comparator corresponding to the filtered output of FIG. 13;

FIG. 16 is a schematic circuit block diagram of the second preferred embodiment of an apparatus for detecting the position of a coordinate probe relative to a digitizing tablet according to the present invention

DETAILED DESCRIPTION OF THE PREFERRED EMBODIMENTS

Figure 1:
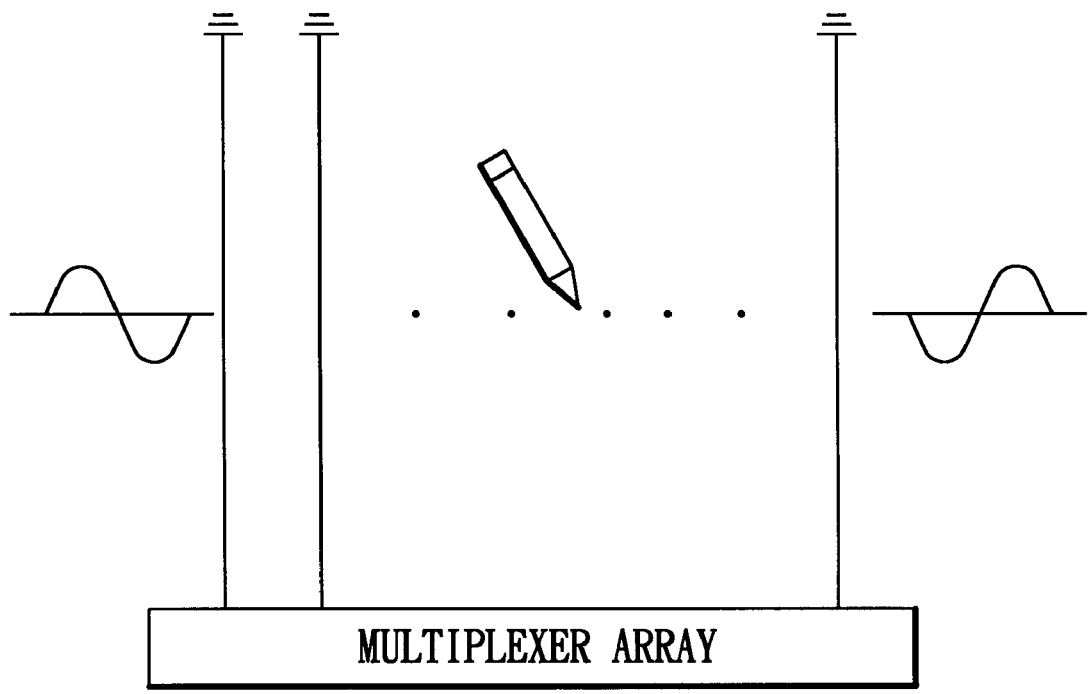
FIG. 1 illustrates the effect of a coordinate probe on a sensing coil grid of a conventional digitizing tablet.
Figure 2:
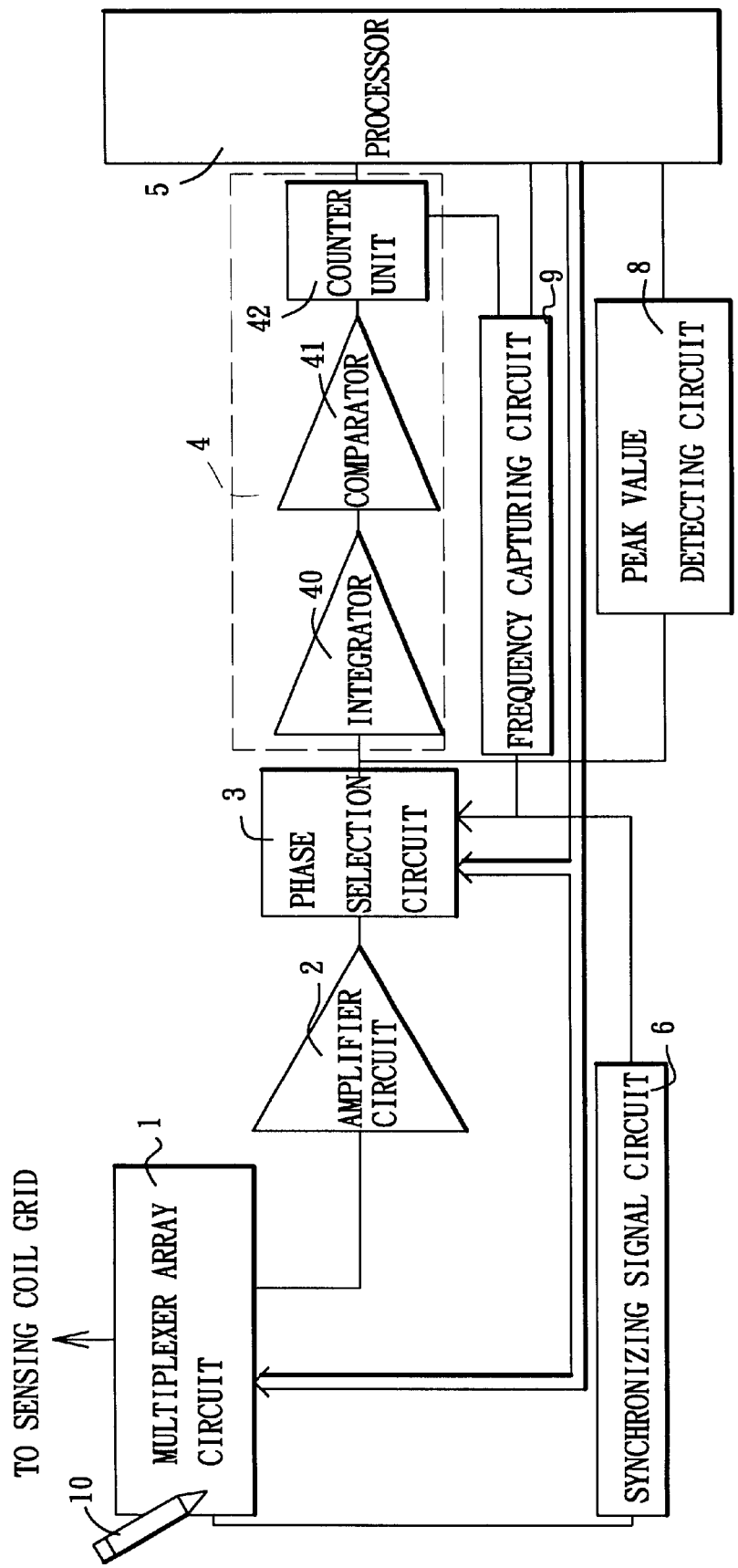
FIG. 2 is a schematic circuit block diagram of the first preferred embodiment of an apparatus for detecting the position of a coordinate probe relative to a digitizing tablet according to the present invention.

Referring to FIG. 2, the first preferred embodiment of an apparatus according to the present invention is shown to be adapted for detecting the position of a wireless coordinate probe 10 relative to a digitizing tablet, and is shown to comprise a multiplexer array circuit 1, an amplifier circuit 2, a phase selection circuit 3, a signal processing circuit 4, a processor 5, a synchronizing signal circuit 6, a peak value detecting circuit 8, and a frequency capturing circuit 9.

The multiplexer array circuit 1 is connected to the amplifier circuit 2. The amplifier circuit 2 is connected to the phase selection circuit 3 which, in turn, is connected to the signal processing circuit 4. The signal processing circuit 4 is connected to the processor 5. The synchronizing signal circuit 6 is connected the phase selection circuit 3. The processor 5 is connected to and controls the multiplexer array circuit 1, and is further connected to the phase selection circuit 3. The peak value detecting circuit 8 is connected to the phase selection circuit 3 and the processor 5. The frequency capturing circuit 9 is connected to the synchronizing signal circuit 6, the signal processing circuit 4 and the processor 5.

Figure 3:
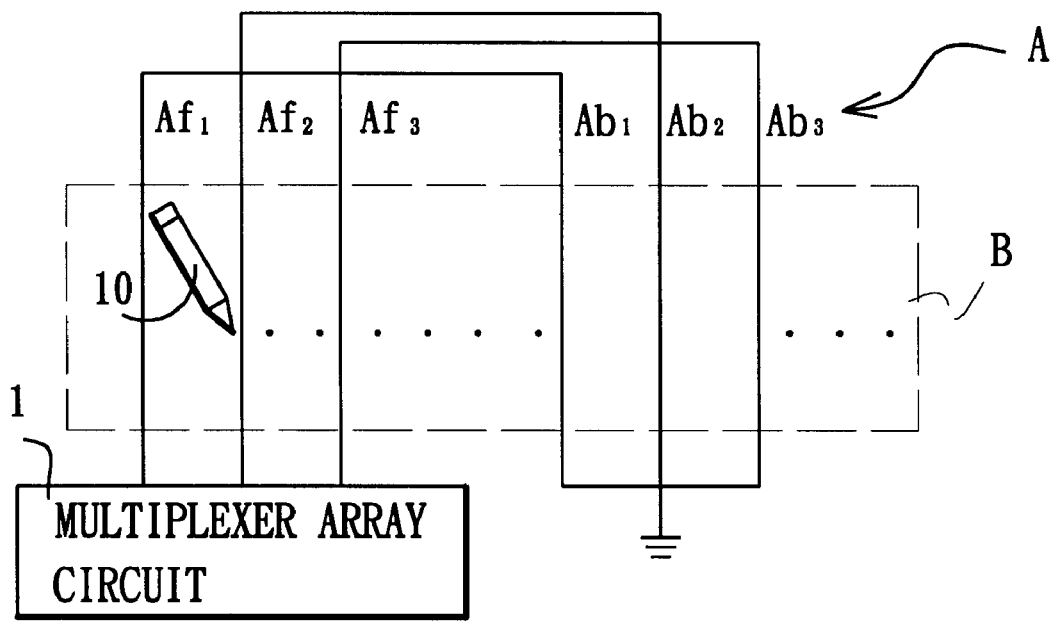
FIG. 3 is a schematic view illustrating a sensing coil grid and a multiplexer array of the first preferred embodiment.

Referring to FIG. 3, the multiplexer array circuit 1, which includes a plurality of switches (not shown), is connected to a sensing coil grid (A). Each of the switches of the multiplexer array circuit 1 is associated with a respective sensing coil of the grid (A). As illustrated, each sensing coil is shaped as an inverted U, and has a front section connected to the multiplexer array circuit 1 and a rear section that is grounded. The sensing coils are arranged in parallel along an axis of the working region (B) of the digitizing tablet in an overlapping manner with the front sections of consecutive ones of the sensing coils being arranged in succession, and with the rear sections of the consecutive ones of the sensing coils also being arranged in succession. When the coordinate probe 10 is disposed on the working region (B) of the digitizing tablet, electric currents are induced in the sensing coils by virtue of the electromagnetic coordinate signal radiated by the coordinate probe 10. The processor 5 controls the multiplexer array circuit 1 to connect the sensing coils in sequence to the amplifier circuit 2 such that the sensing coils are scanned sequentially in order to detect the electric currents induced therein and in order to generate a grid signal that is received by the amplifier circuit 2. The amplifier circuit 2 amplifies the grid signal and provides the same to the phase selection circuit 3.

Figure 4:
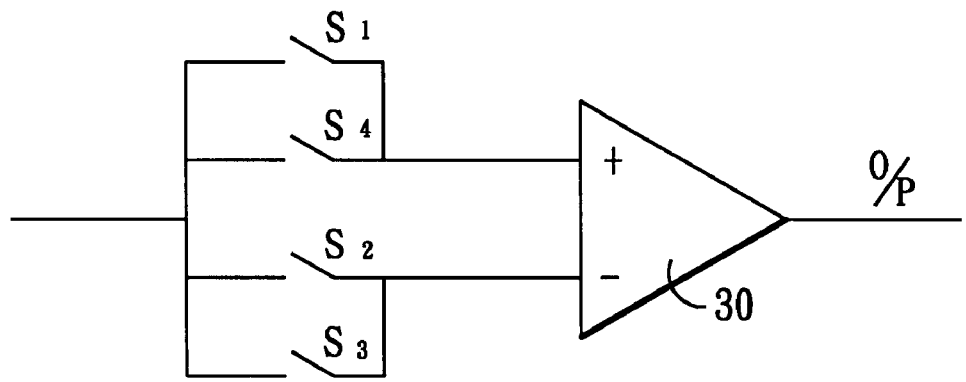
FIG. 4 is a schematic circuit diagram of a phase selection circuit of the first preferred embodiment.

Referring to FIG. 4, the phase selection circuit 3 includes an inverter 30 and first to fourth switches S1, S2, S3, S4. The first and fourth switches S1, S2 are connected in parallel and interconnect the amplifier circuit 2 and the non-inverting input of the inverter 30. The second and third switches S2, S3 are connected in parallel and interconnect the amplifier circuit 2 and the inverting input of the inverter 30. The phase selection circuit 3 receives an inverting signal from the processor 5, and a synchronizing signal from the synchronizing signal circuit 6. The inverting signal (see FIG. 7C) is at a low logic state during a front scanning operation, and is at a high logic state during a rear scanning operation.

Referring to FIG. 5, the synchronizing signal circuit 6 includes a closed loop 61 provided on the working region of the digitizing tablet and formed from a plurality of windings that encompass the sensing coil grid (not shown) on the working region. In this embodiment, the closed loop 61 is formed from three windings (although the number of windings may vary as required) and has a grounded end. The synchronizing signal circuit 6 further includes an amplifier 62 having an input side connected to the closed loop 61, and a comparator 63 having an input side connected to an output side of the amplifier 62. When the coordinate probe 10 is disposed on the working region of the digitizing tablet, a current signal will be induced in the closed loop 61 by virtue of the coordinate signal radiated by the coordinate probe 10. The induced current signal is amplified by the amplifier 62 to obtain an amplified signal that is received by the comparator 63. The comparator 63 subsequently generates a pulse output that serves as the synchronizing signal (see FIG. 7B) only when the amplified signal is in the positive territory.

Referring again to FIG. 4, the switches S1–S4 open and close according to the logic states of the inverting signal from the processor 5, and the synchronizing signal from the synchronizing signal circuit 6. Particularly, the switches S1–S4 open and close according to the truth table shown in FIG. 6. That is, when the inverting signal is at a low logic state, and the synchronizing signal is at a low logic state, the switch S1 is closed, and the inverter 30 does not invert the output of the amplifier circuit 2. When the inverting signal is at a low logic state, and the synchronizing signal is at a high logic state, the switch S2 is closed, and the inverter 30 inverts the output of the amplifier circuit 2. When the inverting signal is at a high logic state, and the synchronizing signal is at a low logic state, the switch S3 is closed, and the inverter 30 inverts the output of the amplifier circuit 2. When the inverting signal is at a high logic state, and the synchronizing signal is at a high logic state, the switch S4 is closed, and the inverter 30 does not invert the output of the amplifier circuit 2.

In FIG. 3, the sensing coil grid (A) is shown to include only three sensing coils to simplify the description of the operation of the phase selection circuit 3. It is to be understood that the sensing coil grid (A) actually includes a large number of the sensing coils. The processor 5 performs the front scanning operation to determine if the coordinate probe 10 is located at the front sections $A_{f1}, A_{f2}, A_{f3}$ of the sensing coils, and the rear scanning operation to determine if the coordinate probe 10 is located at the rear sections $A_{b1}, A_{b2}, A_{b3}$ of the sensing coils. When the sensing coils are scanned, the amplifier circuit 2 provides an amplified grid signal to the phase selection circuit 3.

Figure 7A:
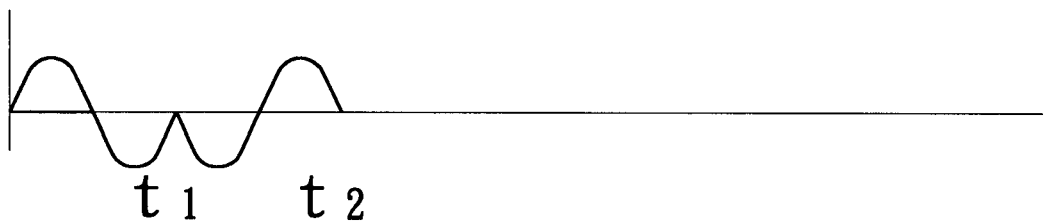
FIG. 7A illustrates a grid signal provided to the phase selection circuit when the coordinate probe is located between front sections $A_{f1}$ and $A_{f2}$ of the sensing coils of the sensing coil grid of FIG. 3.
Figure 7B:
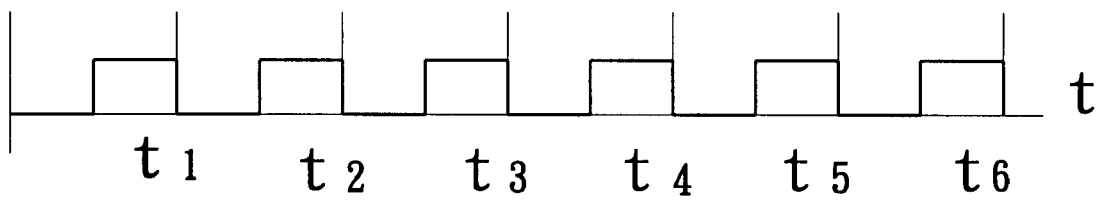
FIG. 7B illustrates a synchronizing signal provided to the phase selection circuit.
Figure 7C:
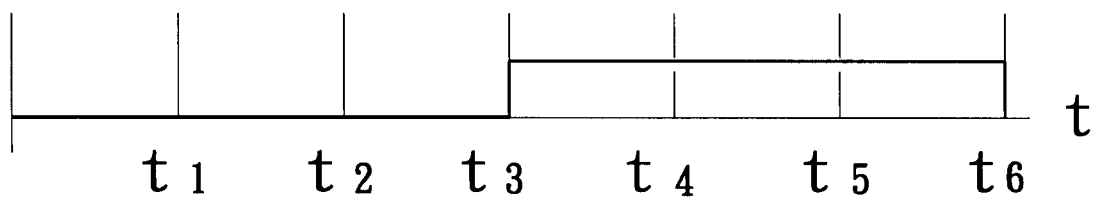
FIG. 7C illustrates an inverting signal provided to the phase selection circuit.

In the following example, it is assumed that the coordinate probe 10 is located between the front sections $A_{f1}, A_{f2}$ of the first and second sensing coils. The coordinate probe 10 is thus disposed inside the first sensing coil and outside the second sensing coil. Under such a condition, the electric current induced in the first sensing coil will be in phase with the coordinate signal radiated by the coordinate probe 10, whereas the electric current induced in the second sensing coil will be out of phase with the coordinate signal from the coordinate probe 10, as is known in the art. FIG. 7A shows the amplified grid signal received by the phase selection circuit 3 from the amplifier circuit 2 when the coordinate probe 10 is located between the front sections $A_{f1}, A_{f2}$ of the first and second sensing coils. The signal detected during the first time period (t1) corresponds to the electric current induced in the first sensing coil, whereas the signal detected during the second time period (t2) corresponds to the electric current induced in the second sensing coil. The synchronizing signal that is received by the phase selection circuit 3 from the synchronizing signal circuit 6 is shown in FIG. 7B. The inverting signal that is received by the phase selection circuit 3 from the processor 5 is shown in FIG. 7C.

According to the synchronizing signal, the inverting signal, and the truth table of FIG. 6, the phase selection circuit 3 does not invert the front half-cycle of the amplified grid signal during the first and second time periods, and inverts the rear half-cycle of the amplified grid signal during the first and second time periods, thereby resulting in an inverted signal (see FIG. 8).

The inverted signal from the phase selection circuit 3 is received by the signal processing circuit 4. As shown in FIG. 2, the signal processing circuit 4 includes an integrator 40 connected to the phase selection circuit 3, a comparator 41 connected to the integrator 40, and a counter unit 42 connected to the comparator 41 and the processor 5. The signal processing circuit 4 is used to detect a high logic-to-low logic transition or a positive-to-negative zero-crossing point in the inverted signal from the phase selection circuit 3. The integrator 40, such as a low-pass filter, filters the inverted signal so as to generate a filtered output (see FIG. 9). The filtered output is received by the comparator 41, which generates a pulse output (see FIG. 10) when the filtered output is in positive territory. By virtue of its connection to the synchronizing signal circuit 6 via the frequency capturing circuit 9, the counter unit 42 is able to generate a count output corresponding to the time elapsed before the high logic-to-low logic transition of the pulse output of the comparator 41 is detected. The counter unit 42 then stops counting, and the count output thereof is received by the processor 5. The processor 5 converts the count output into a coordinate of the coordinate probe 10 along the axis of the working region of the digitizing tablet.

In the following example, it is assumed that the coordinate probe 10 is located between the rear sections $A_{b1}$, $A_{b2}$ of the first and second sensing coils. The coordinate probe 10 is thus disposed outside the first sensing coil and inside the second sensing coil. Under such a condition, the electric current induced in the first sensing coil will be out of phase with the coordinate signal radiated by the coordinate probe 10, whereas the electric current induced in the second and third sensing coils will be in phase with the coordinate signal from the coordinate probe 10, as is known in the art. FIG. 11 shows the amplified grid signal received by the phase selection circuit 3 from the amplifier circuit 2 when the coordinate probe 10 is located between the rear sections $A_{b1}$, $A_{b2}$ of the first and second sensing coils. The signal detected during the first time period (t1) corresponds to the electric current induced in the first sensing coil, the signal detected during the second time period (t2) corresponds to the electric current induced in the second sensing coil, and the signal detected during the third time period (t3) corresponds to the electric current induced in the the third sensing coil. Since only three sensing coils are in use in the example, the duration of the front scanning operation starts from the first time period (t1) and ends at the third time period (t3). The synchronizing signal that is received by the phase selection circuit 3 from the synchronizing signal circuit 6 is shown in FIG. 7B. The inverting signal that is received by the phase selection circuit 3 from the processor 5 is shown in FIG. 7C.

According to the synchronizing signal, the inverting signal, and the truth table of FIG. 6, the inverted signal generated by the phase selection circuit 3 will be that shown in FIG. 12. The inverted signal from the phase selection circuit 3 is received by the signal processing circuit 4. The filtered output of the integrator 40 is shown in FIG. 13, and the pulse output of the comparator 41 is shown in FIG. 14. As illustrated, a high logic-to-low logic transition of the pulse output of the comparator 41 does not occur during the front scanning operation. Under such a condition, the rear scanning operation is performed by the processor 5 to control the multiplexer array circuit 1 to repeat sequential scanning of the sensing coils.

Referring again to FIG. 11, the signal detected during the fourth time period (t4) corresponds to the electric current induced in the first sensing coil, and the signal detected during the fifth time period (t5) corresponds to the electric current induced in the second sensing coil. According to the synchronizing signal, the inverting signal, and the truth table of FIG. 6, the inverted signal (see FIG. 12) generated by the phase selection circuit 3 during the fourth and fifth time periods (t4) and (t5) will result in a transition from positive-to-negative for the filtered output (see FIG. 13) of the integrator 40. As such, the pulse output (see FIG. 14) of the comparator 41 will have a high logic-to-low logic transition between the forth and fifth time periods (t4) and (t5). Since the counter unit 42 stops counting when the high logic-to-low logic transition of the pulse output of the comparator 41 is detected, the count output that is provided to the processor 5 at this time can be converted into a coordinate of the coordinate probe 10 along the axis of the working region of the digitizing tablet.

It has thus been shown that, through the use of the U-shaped sensing coils having a front section connected to the multiplexer array circuit 1 and a grounded rear section, the size of the multiplexer array circuit 1 can be halved by conducting front and rear scanning operations with the aid of a phase selection circuit 3. Manufacturing costs are accordingly lowered due to the simpler construction of the multiplexer array circuit 1.

Preferably, according to the previous coordinate of the coordinate probe 10 as determined by the processor 5, sequential scanning of the sensing coils of the sensing coil grid (A) (see FIG. 3) can be conducted within a relatively narrow range that encompasses the previous coordinate. Thus, determination of a new coordinate of the coordinate probe 10 can be accomplished within a relatively short amount of time. In other words, assuming that there are Y sensing coils in the sensing coil grid, scanning of the sensing coils is initially performed in sequence starting from the first sensing coil. Upon detecting that the coordinate probe 10 is located in a position corresponding to an Nth sensing coil, scanning of a new coordinate of the coordinate probe 10 can start from an (N−A)th sensing coil up to an (N+B)th sensing coil, where A and B are numbers chosen beforehand. If the new coordinate of the coordinate probe 10 is not detected after sequential scanning of the (N−A)th to (N+B)th sensing coils, sequential scanning is repeated starting from the first sensing coil.

Figure 15:
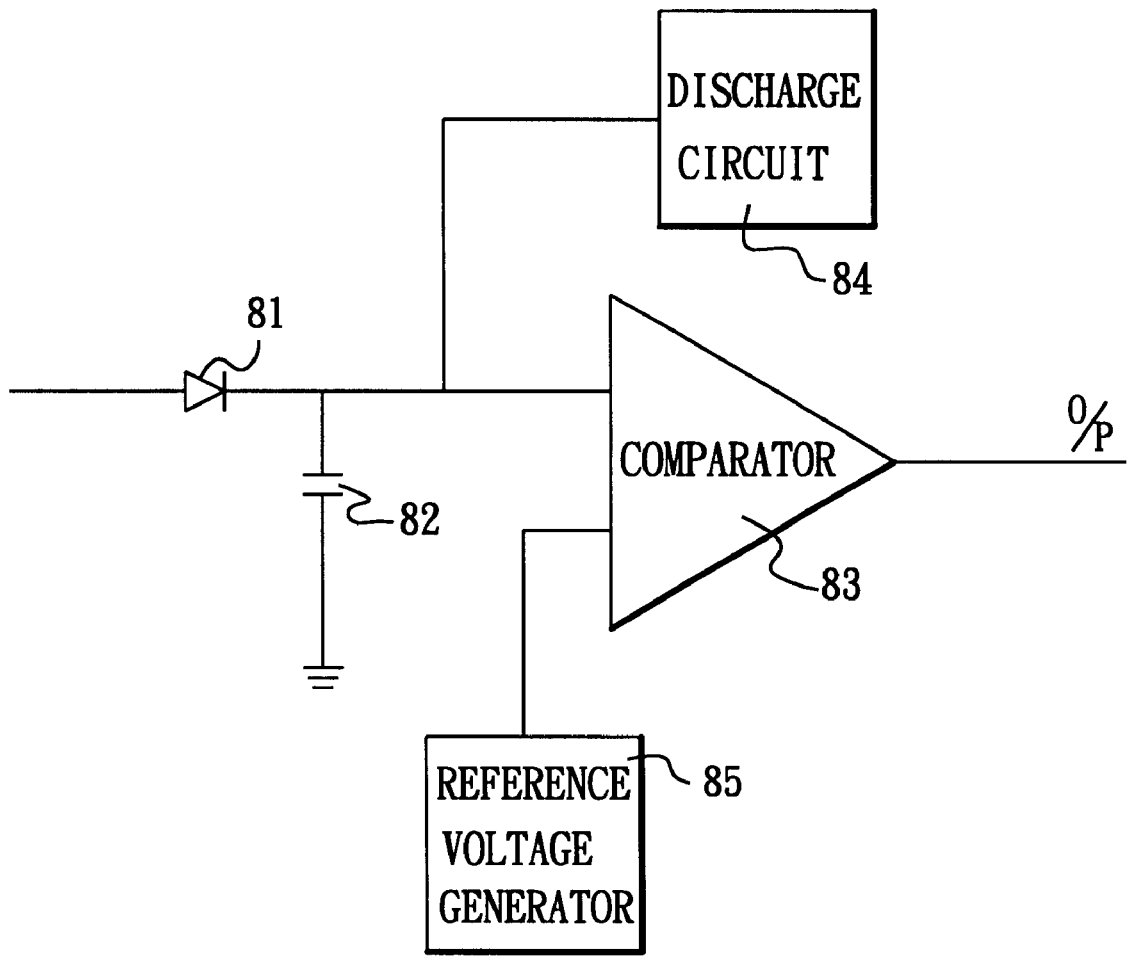
FIG. 15 is a schematic circuit block diagram of a peak value detecting circuit of the first preferred embodiment.

FIG. 15 illustrates the peak value detecting circuit 8. As shown, the peak value detecting circuit 8 includes a diode 81 having an anode connected to the phase selection circuit 3, a capacitor 82 connected across a cathode of the diode 81 and a ground, a discharge circuit 84 connected to the capacitor 82, a reference voltage generator 85, and a comparator 83 having inputs connected to the capacitor 82 and the reference voltage generator 85, and an output connected to the processor 5. The discharge circuit 84 includes a switch and a resistor. Prior to scanning of the sensing coil grid, the discharge circuit 84 is operated to provide a discharge path for residual charge stored in the capacitor 82. When scanning of the sensing coil grid is initiated, the discharge circuit 84 is disabled to permit storing of charges in the capacitor 82.

With the discharge circuit 84 in a disabled state, the inverted signal from the phase selection circuit 3 is used to charge the capacitor 82 via the diode 81, such that the capacitor 82 is able to store a charge corresponding to a peak value of the inverted signal. The comparator 83 then compares the charge of the capacitor 82 with a reference voltage from the reference voltage generator 85, and provides the result to the processor 5. Depending on the result, the processor 5 is inhibited from converting the count output from the counter unit 42 of the signal processing circuit 4 into a coordinate of the coordinate probe 10 when the charge of the capacitor 82 is less than the reference voltage from the reference voltage generator 85.

The peak value detecting circuit 8 can be used to detect the height of the coordinate probe 10 relative to the working region of the digitizing tablet. When the height of the coordinate probe 10 is below a predetermined upper limit, the electric currents induced in the sensing coils of the grid are deemed to be valid signals. Otherwise, when the height of the coordinate probe 10 is above the predetermined upper limit, the electric currents induced in the sensing coils of the grid are deemed to be invalid signals, and the count output of the counter unit 42 of the signal processing circuit 4 is simply discarded by the processor 5. Therefore, erroneous operation of the digitizing tablet and the occurrence of phantom images can be avoided, thereby enhancing accuracy of the apparatus of this invention.

Wireless coordinate probes 10 that have a switching capability are known in the art. Such coordinate probes 10 have the ability to generate a particular frequency output to indicate a corresponding switched state. To this end, wireless coordinate probes 10 incorporate a tuning circuit for varying the oscillating frequency output of an oscillator. The tuning circuit can be a variable inductor having an inductance that varies according to the pressure applied to a pointing tip of the coordinate probe, a plurality of capacitors selectively connected and disconnected with the use of switches to form a variable capacitance, or a combination of both. One example of a wireless coordinate probe that incorporates both a variable inductor and switched capacitors is disclosed in a co-pending U.S. Patent Application entitled "Cordless Position Pointing Device With Energy-Conserving Capability for a Coordinate Input Apparatus," filed by the applicant.

Referring once again to FIG. 2, the frequency capturing circuit 9 enables the apparatus of this invention to be used with a wireless coordinate probe having a variable frequency output. The frequency capturing circuit 9, which is formed from a frequency divider, is connected to the synchronizing signal circuit 6, and determines the frequency of the synchronizing signal received therefrom using known frequency measuring techniques. The frequency of the synchronizing signal is equal to that of the coordinate signal radiated by the coordinate probe 10. The frequency capturing circuit 9 is used to enable counting operation of the counter unit 42 of the signal processing circuit 4, and provides a detected frequency output to the processor 5. According to the detected frequency, the processor 5 is able to determine the switched state of the coordinate probe 10, and performs the operation associated therewith, such as adjustment of the thickness of lines drawn with the use of the coordinate probe 10, and the like.

While the first preferred embodiment has been described as capable of detecting the position of the coordinate probe 10 along an axis of the working region of the digitizing tablet, it is to be understood that two of the apparatus of the first preferred embodiment can be implemented for detecting the X and Y coordinates of the coordinate probe 10 on the working region.

Referring to FIG. 16, the second preferred embodiment of an apparatus according to the present invention, which is adapted for detecting the position of a wired coordinate probe 10' relative to a digitizing tablet, is shown to also comprise a multiplexer array circuit 1', an amplifier circuit 2', a phase selection circuit 3', a signal processing circuit 4', and a processor 5'. In contrast with the apparatus of the previous embodiment, the apparatus of the second preferred embodiment does not include a synchronizing signal circuit 6, a peak value detecting circuit 8, and a frequency capturing circuit 9. Instead, the apparatus of the second preferred embodiment further includes a probe sensing circuit 6' and a switched state and pressure value detecting circuit 11.

The switched state and pressure value detecting circuit 11 is connected to the coordinate probe 10' and the processor 5', and generates an output corresponding to the state of switches on the coordinate probe 10' and the value of pressure applied to the pointing tip of the coordinate probe 10'. The output of the switched state and pressure value detecting circuit 11 is provided to the processor 5' so that the operation associated with the state of switches on the coordinate probe 10' and the value of pressure applied to the pointing tip of the coordinate probe 10' can be performed. An example of the switched state and pressure value detecting circuit 11 has been disclosed in a co-pending U.S. Patent Application entitled "Pressure Transducer and Transducing Method for a Position Probe of a Coordinate Input Device," filed by the applicant.

The probe sensing circuit 6' is connected to the processor 5', and includes a closed loop provided on the working region of the digitizing tablet. Like the closed loop 61 of the synchronizing signal circuit 6 of the previous embodiment, the closed loop of the probe sensing circuit 6' is formed from a plurality of windings that encompass the sensing coil grid on the working region of the digitizing tablet, and has a grounded end. When the coordinate probe 10' is disposed inside the closed loop, the current signal induced therein is in phase with the coordinate signal radiated by the coordinate probe 10'. Accordingly, when the coordinate probe 10' is disposed outside the closed loop, the current signal induced therein is out of phase with the coordinate signal radiated by the coordinate probe 10'. Therefore, by comparing the phase of the current signal induced in the closed loop of the probe sensing circuit 6' with that of the coordinate signal radiated by the coordinate probe 10', the processor 5' is able to detect whether or not the coordinate probe 10' is inside the working region of the digitizing tablet. The processor 5' can thus be inhibited from converting the count output of the counter unit of the signal processing circuit 4' into a coordinate of the coordinate probe 10' when the latter is outside the working region, thereby avoiding erroneous operation of the digitizing tablet and the occurrence of phantom images to enhance accuracy of the apparatus of this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for detecting the position of a coordinate probe relative to a digitizing tablet, the coordinate probe radiating an electromagnetic coordinate signal, the method comprising:

(a) providing a sensing coil grid on a working region of the digitizing tablet, the sensing coil grid including a plurality of sensing coils, each of which is U-shaped and has a front section and a grounded rear section, the sensing coils being arranged in parallel along an axis of the working region in an overlapping manner with the front sections of consecutive ones of the sensing coils being arranged in succession, and with the rear sections of the consecutive ones of the sensing coils also being arranged in succession, wherein electric currents are induced in the sensing coils by virtue of the coordinate signal when the coordinate probe is disposed on the working region;

(b) performing a front scanning operation, including
      scanning in sequence the sensing coils in order to detect the electric currents induced therein and to generate a grid signal,
      generating an inverted signal by inverting a predetermined one of front and rear half-cycles of the grid signal, and
      detecting a predetermined transition of the inverted signal from a first logic state to a second logic state;

(c) performing a rear scanning operation when the predetermined transition of the inverted signal is not detected after the front scanning operation has been completed, including
      repeating sequential scanning of the sensing coils in order to continue generation of the grid signal,
      generating the inverted signal by inverting the other one of the front and rear half-cycles of the grid signal, and detecting the predetermined transition of the inverted signal from the first logic state to the second logic state;

(d) generating a count output corresponding to time elapsed before the predetermined transition of the inverted signal is detected; and (e) converting the count output into a coordinate of the coordinate probe along the axis of the working region of the digitizing tablet.

2. The method as claimed in claim 1, wherein the steps (b) and (c) further include:

amplifying the grid signal prior to generating the inverted signal.

3. The method as claimed in claim 1, wherein the rear half-cycle of the grid signal is inverted during the front scanning operation, and the front half-cycle of the grid signal is inverted during the rear scanning operation.

4. The method as claimed in claim 3, wherein the predetermined transition of the inverted signal is from a high logic state to a low logic state.

5. The method as claimed in claim 3, wherein the step of detecting the predetermined transition of the inverted signal in steps (b) and (c) includes:

filtering the inverted signal to generate a filtered output; and generating a pulse output when amplitude of the filtered output is in positive territory.

6. The method as claimed in claim 1, wherein:

when detecting a new coordinate of the coordinate probe, sequential scanning of the sensing coils is performed within a relatively narrow range that encompasses a previous coordinate of the coordinate probe.

7. The method as claimed in claim 6, wherein:

when the new coordinate of the coordinate probe is not detected after sequential scanning within the relatively narrow range, sequential scanning is repeated starting from a first one of the sensing coils.

8. The method as claimed in claim 1, further comprising:

detecting height of the coordinate probe relative to the working region; and inhibiting conversion of the count output into the coordinate of the coordinate probe when the height of the coordinate probe is above an upper limit.

9. The method as claimed in claim 1, further comprising:

detecting a peak value of the inverted signal;

comparing the peak value with a reference value; and inhibiting conversion of the count output into the coordinate of the coordinate probe when the peak value is less than the reference value.

10. The method as claimed in claim 1, further comprising:

detecting frequency of the coordinate signal radiated by the coordinate probe.

11. The method as claimed in claim 1, further comprising:

generating a synchronizing signal having a frequency equal to that of the coordinate signal radiated by the coordinate probe.

12. The method as claimed in claim 11, wherein the step of generating the synchronizing signal includes:

providing a closed loop formed from a plurality of windings that encompass the sensing coil grid on the working region of the digitizing tablet, the closed loop having a grounded end, wherein a current signal is induced in the closed loop by virtue of the coordinate signal when the coordinate probe is disposed on the working region.

13. The method as claimed in claim 12, wherein the step of generating the synchronizing signal further includes:

amplifying the current signal induced in the closed loop to obtain an amplified signal.

14. The method as claimed in claim 13, wherein the step of generating the synchronizing signal further includes:

generating a pulse output that serves as the synchronizing signal only when the amplified signal is in negative territory.

15. The method as claimed in claim 1, further comprising:

detecting a switched state of the coordinate probe.

16. The method as claimed in claim 1, further comprising:

detecting a pressure value applied to a pointing tip of the coordinate probe.

17. The method as claimed in claim 1, further comprising:

detecting whether or not the coordinate probe is inside the working region; and inhibiting conversion of the count output into the coordinate of the coordinate probe when the coordinate probe is outside the working region.

18. The method as claimed in claim 1, further comprising:

providing a closed loop formed from a plurality of windings that encompass the sensing coil grid on the working region of the digitizing tablet, the closed loop having a grounded end, wherein a current signal is induced in the closed loop by virtue of the coordinate signal when the coordinate probe is disposed on the working region;

detecting whether or not the coordinate probe is inside the working region by comparing phase of the current signal induced in the closed loop with that of the coordinate signal radiated by the coordinate probe, where the current signal and the coordinate signal are in phase when the coordinate probe is inside the working region, and are out of phase when the coordinate probe is outside the working region; and inhibiting conversion of the count output into the coordinate of the coordinate probe when the coordinate probe is outside the working region.

19. An apparatus for detecting the position of a coordinate probe relative to a digitizing tablet, the coordinate probe radiating an electromagnetic coordinate signal, said apparatus comprising:

a sensing coil grid adapted to be provided on a working region of the digitizing tablet, said sensing coil grid including a plurality of sensing coils, each of which is U-shaped and has a front section and a grounded rear section, said sensing coils being arranged in parallel along an axis of the working region in an overlapping manner with said front sections of consecutive ones of said sensing coils being arranged in succession, and with said rear sections of the consecutive ones of said sensing coils also being arranged in succession, wherein electric currents are induced in said sensing coils by virtue of the coordinate signal when the coordinate probe is disposed on the working region;

a multiplexer array circuit connected to said front sections of said sensing coils;

a phase selection circuit connected to said multiplexer array circuit;

a signal processing circuit connected to said phase selection circuit; and processor means connected to said multiplexer array circuit, said phase selection circuit and said signal processing circuit;

said processor means being operable to perform a front scanning operation, where said processor means controls said multiplexer array circuit to connect said sensing coils in sequence to said phase selection circuit such that said sensing coils are scanned sequentially in order to detect the electric currents induced therein and in order to generate a grid signal that is received by said phase selection circuit, where said processor means controls said phase selection circuit to generate an inverted signal by inverting a predetermined one of front and rear half-cycles of the grid signal, and where said signal processing circuit detects a predetermined transition of the inverted signal from a first logic state to a second logic state;

said processor means being further operable so as to perform a rear scanning operation when the predetermined transition of the inverted signal is not detected by said signal processing circuit after the front scanning operation has been completed, where said processor means controls said multiplexer array circuit to repeat sequential scanning of said sensing coils in order to continue generation of the grid signal, where said processor means controls said phase selection circuit so as to generate the inverted signal by inverting the other one of the front and rear half-cycles of the grid signal, and where said signal processing circuit detects the predetermined transition of the inverted signal from the first logic state to the second logic state;

said signal processing circuit generating a count output corresponding to time elapsed before the predetermined transition of the inverted signal is detected;

said processor means receiving the count output from said signal processing circuit, and converting the count output into a coordinate of the coordinate probe along the axis of the working region of the digitizing tablet.

20. The apparatus as claimed in claim 19, further comprising an amplifier circuit interconnecting said multiplexer array circuit and said phase selection circuit for amplifying the grid signal prior to reception by said phase selection circuit.

21. The apparatus as claimed in claim 19, wherein said phase selection circuit inverts the rear half-cycle of the grid signal during the front scanning operation, and inverts the front half-cycle of the grid signal during the rear scanning operation.

22. The apparatus as claimed in claim 21, wherein the predetermined transition of the inverted signal is from a high logic state to a low logic state.

23. The apparatus as claimed in claim 21, wherein said signal processing circuit includes:
an integrator, connected to said phase selection circuit, for filtering the inverted signal so as to generate a filtered output; and
a comparator, connected to said integrator, for generating a pulse output when amplitude of the filtered output is in positive territory.

24. The apparatus as claimed in claim 23, wherein said signal processing circuit further includes a counter unit interconnecting said comparator and said processor means and providing the count output to said processor means.

25. The apparatus as claimed in claim 19, wherein sequential scanning of said sensing coils is performed within a relatively narrow range that encompasses a previous coordinate of the coordinate probe when detecting a new coordinate of the coordinate probe.

26. The apparatus as claimed in claim 25, wherein sequential scanning is repeated starting from a first one of said sensing coils when the new coordinate of the coordinate probe is not detected after sequential scanning within the relatively narrow range.

27. The apparatus as claimed in claim 19, further comprising:
detecting means for detecting height of the coordinate probe relative to the working region, said detecting means being connected to said processor means so as to inhibit said processor means from converting the count output into the coordinate of the coordinate probe when the height of the coordinate probe is above an upper limit.

28. The apparatus as claimed in claim 19, further comprising:
a peak value detecting circuit, connected to said processor means and said phase selection circuit, for detecting a peak value of the inverted signal, and for comparing the peak value with a reference value, said processor means being inhibited from converting the count output into the coordinate of the coordinate probe when the peak value is less than the reference value.

29. The apparatus as claimed in claim 28, wherein said peak value detecting circuit includes:
a capacitor, connected to said phase selection circuit, for storing a charge corresponding to the peak value of the inverted signal; and
a comparator, connected to said capacitor and said processor means, for comparing the charge of said capacitor with a reference voltage corresponding to the reference value, and for inhibiting said processor means from converting the count output into the coordinate of the coordinate probe when the charge of said capacitor is less than the reference voltage.

30. The apparatus as claimed in claim 29, wherein said peak value detecting circuit further includes a diode interconnecting said phase selection circuit and said capacitor.

31. The apparatus as claimed in claim 29, wherein said peak value detecting circuit further includes a discharge circuit connected to said capacitor and operable selectively so as to discharge said capacitor prior to scanning of said sensing coils.

32. The apparatus as claimed in claim 19, further comprising:
frequency capturing means, connected to said processor means, for detecting frequency of the coordinate signal radiated by the coordinate probe.

33. The apparatus as claimed in claim 19, further comprising:
a synchronizing signal circuit for generating a synchronizing signal having a frequency equal to that of the coordinate signal radiated by the coordinate probe.

34. The apparatus as claimed in claim 33, wherein said synchronizing signal circuit includes:
a closed loop adapted to be provided on the working region of the digitizing tablet and formed from a plurality of windings that encompass said sensing coil grid on the working region, said closed loop having a grounded end, wherein a current signal is induced in said closed loop by virtue of the coordinate signal when the coordinate probe is disposed on the working region.

35. The apparatus as claimed in claim 34, wherein said synchronizing signal circuit further includes:
an amplifier, connected to said closed loop, for amplifying the current signal induced in said closed loop to obtain an amplified signal.

36. The apparatus as claimed in claim 35, wherein said synchronizing signal circuit further includes:

a comparator, connected to said amplifier, for generating a pulse output that serves as the synchronizing signal only when the amplified signal is in negative territory.

37. The apparatus as claimed in claim 33, further comprising:

a frequency capturing circuit, connected to said synchronizing signal circuit and said processor means, for detecting frequency of the synchronizing signal.

38. The apparatus as claimed in claim 37, wherein said frequency capturing circuit is further connected to said signal processing circuit to enable said signal processing circuit to generate the count output.

39. The apparatus as claimed in claim 19, further comprising:

means, connected to said processor means, for detecting a switched state of the coordinate probe.

40. The apparatus as claimed in claim 19, further comprising:

means, connected to said processor means, for detecting a pressure value applied to a pointing tip of the coordinate probe.

41. The apparatus as claimed in claim 19, further comprising:

a probe sensing circuit, connected to said processor means, for detecting whether or not the coordinate probe is inside the working region, said processor means being inhibited from converting the count output into the coordinate of the coordinate probe when the coordinate probe is outside the working region.

42. The apparatus as claimed in claim 41, wherein said probe sensing circuit includes:

a closed loop adapted to be provided on the working region of the digitizing tablet and formed from a plurality of windings that encompass said sensing coil grid on the working region, said closed loop having a grounded end, wherein a current signal is induced in said closed loop by virtue of the coordinate signal when the coordinate probe is disposed on the working region, the current signal and the coordinate signal being in phase when the coordinate probe is inside the working region, and being out of phase when the coordinate probe is outside the working region.

* * * * *